(12) United States Patent
Zhang et al.

(10) Patent No.: US 12,314,290 B2
(45) Date of Patent: May 27, 2025

(54) KEY CATEGORY IDENTIFICATION AND VISUALIZATION

(71) Applicant: INTERNATIONAL BUSINESS MACHINES CORPORATION, Armonk, NY (US)

(72) Inventors: Xue Ying Zhang, Xi'an (CN); Si Er Han, Xi'an (CN); Jing Xu, Xi'an (CN); Xiao Ming Ma, Xi'an (CN); Wen Pei Yu, Xi'an (CN); Jing James Xu, Xi'an (CN); Jun Wang, Xi'an (CN); Ji Hui Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/333,510

(22) Filed: Jun. 12, 2023

(65) Prior Publication Data

US 2024/0411783 A1    Dec. 12, 2024

(51) Int. Cl.
- G06F 7/00 (2006.01)
- G06F 11/34 (2006.01)
- G06F 16/28 (2019.01)

(52) U.S. Cl.
CPC ........ G06F 16/287 (2019.01); G06F 11/3409 (2013.01)

(58) Field of Classification Search
CPC .. G06F 16/287; G06F 16/2365; G06F 16/215; G06F 16/2379; G06F 16/285; G06F 16/278; G06F 16/2255; G06F 16/256; G06F 16/2453; G06F 16/2282; G06F 11/3409;

(Continued)

(56) References Cited

U.S. PATENT DOCUMENTS

| 7,457,808 B2 | 11/2008 | Gaussier |
| 7,561,158 B2 | 7/2009 | Abe |
| 10,706,323 B1 | 7/2020 | Liebman |

(Continued)

FOREIGN PATENT DOCUMENTS

| CN | 106776326 B | 7/2020 |
| CN | 115795361 A | 3/2023 |

OTHER PUBLICATIONS

Yang, B. et al., "Cross-Category Tea Polyphenols Evaluation Model Based on Feature Fusion of Electronic Nose and Hyperspectral Imagery", Sensors (2020), vol. 20:50, 18 pgs.

(Continued)

*Primary Examiner* — Mohammad A Sana
(74) *Attorney, Agent, or Firm* — Intelletek Law Group, PLLC; Gabriel Daniel, Esq.

(57) ABSTRACT

A computer-implemented method for treating post-modeling data includes computing, sequentially for each category of a feature, a category importance (CI) value. The CI value is based on a model accuracy change when records of a category being examined are reassigned to a remaining set of categories of the feature according to a cumulative distribution of records among the remaining set of categories of the feature, wherein the remaining set of categories include all categories of the feature, except for the category being examined. A post-modeling category is performed to merge of each category having the CI value less than a CI value threshold.

19 Claims, 10 Drawing Sheets

(58) Field of Classification Search
CPC ............ G06F 11/0793; G06F 11/0751; G06F 40/169; G06F 40/117
See application file for complete search history.

(56) References Cited

U.S. PATENT DOCUMENTS

| | | | |
|---|---|---|---|
| 11,907,208 B1* | 2/2024 | Tayeb | ................. G06F 16/2365 |
| 2018/0060335 A1* | 3/2018 | Acharya | ............... G06F 16/162 |
| 2022/0327418 A1 | 10/2022 | Yu et al. | |
| 2023/0026787 A1 | 1/2023 | Lee et al. | |
| 2023/0088183 A1* | 3/2023 | Villanueva | ............... G06N 5/01 |
| | | | 707/723 |
| 2024/0111944 A1* | 4/2024 | Pol | ......................... G06F 40/169 |
| 2024/0126732 A1* | 4/2024 | Ablitt | ................. G06F 16/2365 |

OTHER PUBLICATIONS

Rengasamy, D. et al., "Feature importance in machine learning models: A fuzzy information fusion approach", Neurocomputing (2022); vol. 511, pp. 163-174.
IBM, "IBM SPSS Modeler 15 Algorithms Guide" (1994), 404 pgs.
Guo, Y. et al., "Incorporating Association Rule Networks in Feature Category-Weighted Naive Bayes Model to Support Weaning Decision Making", Decision Support System (2017), 46 pgs.

\* cited by examiner

|  | 1 | 2 | ... | S |
|---|---|---|---|---|
| $X_1$ | | | Y | |
| 1 | (1,1) | (1,2) | ... | (1,S) |
| 2 | (2,1) | (2,2) | ... | (2,S) |
| ⋮ | ⋮ | ⋮ | ⋱ | ⋮ |
| R | (R,1) | (R,2) | ... | (R,S) |

FIG. 2

| $X_i$ | 1 | 2 | ... | S | Total | Freq | Cumu |
|---|---|---|---|---|---|---|---|
| 1 | 43 | 28 | ... | 56 | 600 | 0.2 | 0.2 |
| 2 | 5 | 77 | ... | 11 | --- | --- | --- |
| 3 | 20 | 45 | ... | 11 | 550 | 0.18 | 0.38 |
| . | . | . | . | . | . | | |
| R | 100 | 98 | ... | 83 | 820 | 0.27 | 1 |

FIG. 4

KEY CATEGORY IDENTIFICATION AND VISUALIZATION

BACKGROUND

Technical Field

The present disclosure generally relates to the identification and visualization of key categories in a machine learning model, and more particularly, to a computer-implemented method, a computer system, and a computer program product for computing post-modeling category importance, detecting and illustrating key categories, and merging categories with weak importance.

Description of the Related Art

After model building, feature importance is may be provided, typically in a bar graph, or similar data form, that illustrates the number of times a model identifies feature in a dataset. Feature importance, however, provides one value for each feature. Outputs with more information about the relation of features are very useful for users to understand and improve the model.

SUMMARY

In one embodiment, a system and method are provided that can compute post-modeling category importance, detect and illustrate key categories, and merge categories with weak importance, where the category merge can significantly reduce data collection and preprocessing efforts.

In one embodiment, a computer-implemented method for treating post-modeling data includes computing a first category importance (CI) value for a selected category of a feature. The first CI value is based on a model accuracy change when records of the selected category are reassigned to a remaining set of categories of the feature according to a cumulative distribution of records among the remaining set of categories of the feature, wherein the remaining set of categories include all categories of the feature, except for the selected category.

In another embodiment, a computer-implemented method for treating post-modeling data includes computing, sequentially for each category of a feature, a category importance (CI) value. The CI value is based on a model accuracy change when records of a category being examined are reassigned to a remaining set of categories of the feature according to a cumulative distribution of records among the remaining set of categories of the feature, wherein the remaining set of categories include all categories of the feature, except for the category being examined. A post-modeling category merge can be performed of each category having the CI value less than a CI value threshold.

In some embodiments, the reassigning of the remaining set of categories of the feature includes drawing a random number b from [0,1] for each record in the selected category and reassigning each record to one category of the set of remaining categories based on a comparison of the random number to the cumulative distribution for each category.

In some embodiments, the method further includes reducing data collection computational overhead by relying on a reduced number of categories based on the post-modeling category merge for new data.

In some embodiments, when a first category and a second category each have a respective CI value less than the CI value threshold, the method further includes determining a first model accuracy change based on a first merge process of merging the first category into the second category and determining a second model accuracy change based on a second merge process of merging the second category into the first category. A first merge process is performed when the first model accuracy change is less than the second model accuracy change or a second merge process is performed with the second model accuracy change is less than the first model accuracy change.

In some embodiments, the method further includes providing an illustration of strong CI categories with a CI value above a predetermined CI value threshold. The illustration includes both the CI values of the strong CI categories of the feature and a number of records provided for the strong CI categories of the feature. In some embodiments, the illustration further includes weak CI categories with the CI value less than the predetermined CI value threshold.

The above method can be performed on computer readable storage medium tangibly embodying a computer readable program code having computer readable instructions that, when executed, causes a computer device to provide methods for computing post-modeling category importance, detecting and illustrating key categories, and merging categories with weak importance.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2 shows a table of features, $X_1$, and targets Y with table cells denoting locations for placement of results from operating a model on a dataset;

FIG. 4 shows the use of the table of FIG. 3 for a computation of category importance, consistent with an illustrative embodiment;

DETAILED DESCRIPTION

Figure 1:
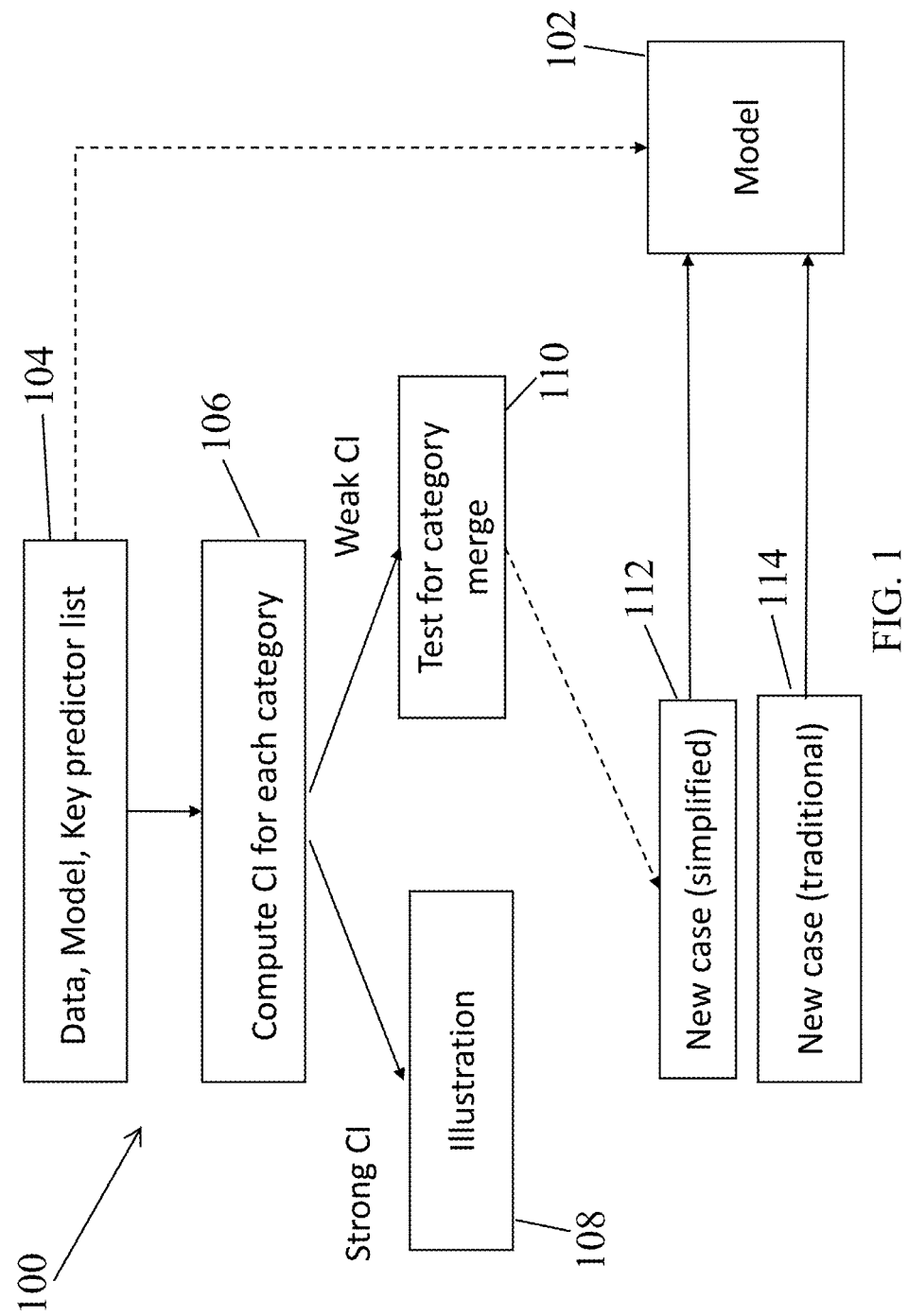
FIG. 1 shows an overall workflow for computing post-modeling category importance, detecting and illustrating key categories, and merging categories with weak importance, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Broadly, aspects of the present disclosure provide systems and methods that can compute post-modeling category importance, detect and illustrate key categories, and merge categories with weak importance. As discussed in greater detail below, the method can compute category importance (CI) for each category of the most important features. The CI value is based on a model accuracy change when the category value under examination is changed to other values according to category distribution. The method can further provide an illustration of categories with strong CI and present the CI of each key category along with distribution information. Finally, the method can perform a post-modeling category merge of those features with weak CI value, thus significantly reducing data collection and preprocessing efforts by a computing device.

Although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may compute post-modeling category importance, detect and illustrate key categories, and merge categories with weak importance. This may have the technical effect of significantly reducing data collection and preprocessing efforts in a computing device.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

As used herein, the terms "predictor" and "feature" are used interchangeably. For example, the "predictor" (or "feature") called "outfit color" is an important predictor for the target "insect attraction". This predictor may originally be designed to have multiple categories such as "green", "gray", "yellow", "blue", and the like. However, after model building, it may be found that only "yellow" category triggers the target "insect attraction—Yes", while all other colors lead to "insect attraction—No". This information is very useful in modeling understanding and future data collection simplification. This example is referred to in the discussion below.

Example Process

It may be helpful now to consider a high-level discussion of an example process. To that end, FIG. 1 presents an illustrative process 100 related to the method for computing post-modeling category importance, detecting and illustrating key categories, and merging categories with weak importance. Process 100 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

In the process 100, a model 102 may provide post modeling data and may include a key predictor list, as shown in block 104. As discussed in greater detail below, the systems and methods of the present disclosure can use this data to compute a category importance (CI) for each category, as shown at block 106. If there is a strong computed CI, then, at block 108, an illustration, as described below, can be provided to the user by the system. If there is a weak computed CI, then, at block 110, these categories can be tested for a category merge. The terms "strong" and "weak", as they relate to the CI, may be determined by the user, for example, as an input to the method. In some embodiments, the user may select the top 3 categories, and the system can determine a "strong"/"weak" designation based on the data and the user's desire to have the top three categories to be considered as having a "strong" CI. In other embodiments, the cutoff for a "strong" CI may be a predetermined number provided by the system. As described in greater detail below, an accuracy ratio may be computed to quantitatively represent the CI for a given category.

In the example described above, for the feature $X_1$ as outfit color, the categories include red, green, yellow, and the like. If yellow is determined to have a strong CI with respect to the target "insect attraction", and red and green are determined to have a weak CI with respect to the target "insect attraction", the red and green categories can be merged into the yellow category, for example, as described in greater detail below.

A new case (simplified), at block 112, can be used for the model 102, where the new case (simplified) may be simplified to include a reduced number of categories, reflected by the determination of a weak CI, in the processing of new data. The new case (traditional), at block 114, may still use all the original categories during collection of new data. In the example of outfit color, if the red and green categories are merged into the yellow category, with the new case (simplified) block 112, the model 102 may only need to determine, with respect to the "insect attraction" target, the feature "yellow outfit" or "not yellow outfit".

Figure 2:
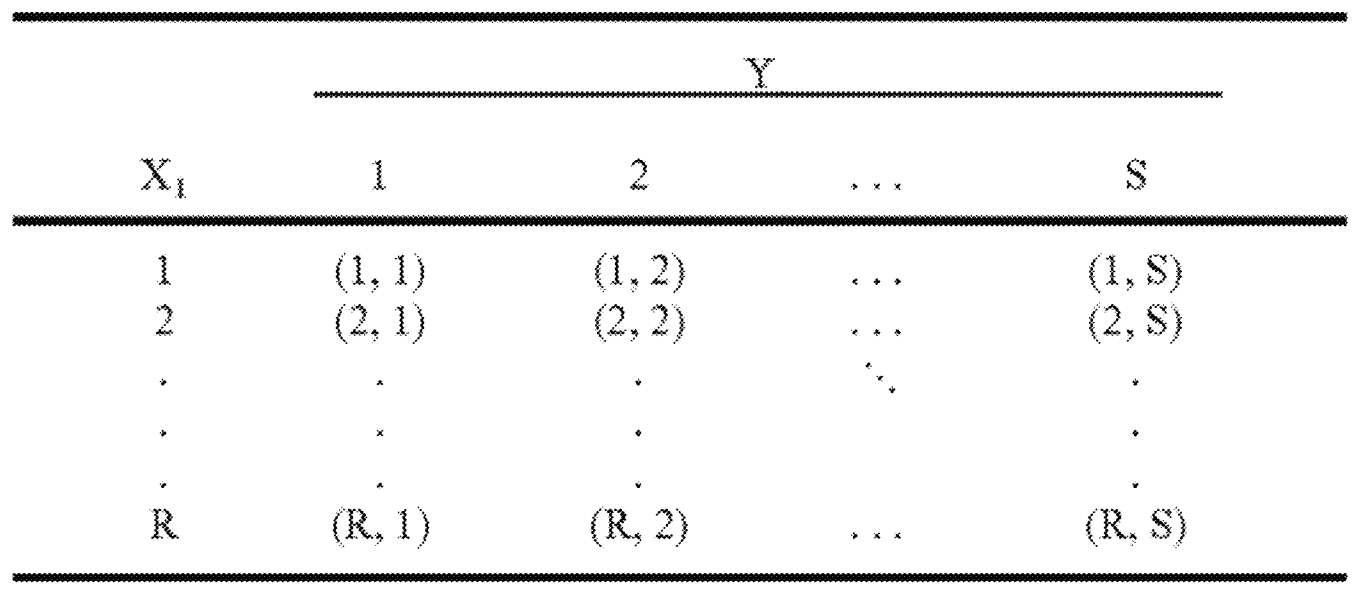
Figure 3:
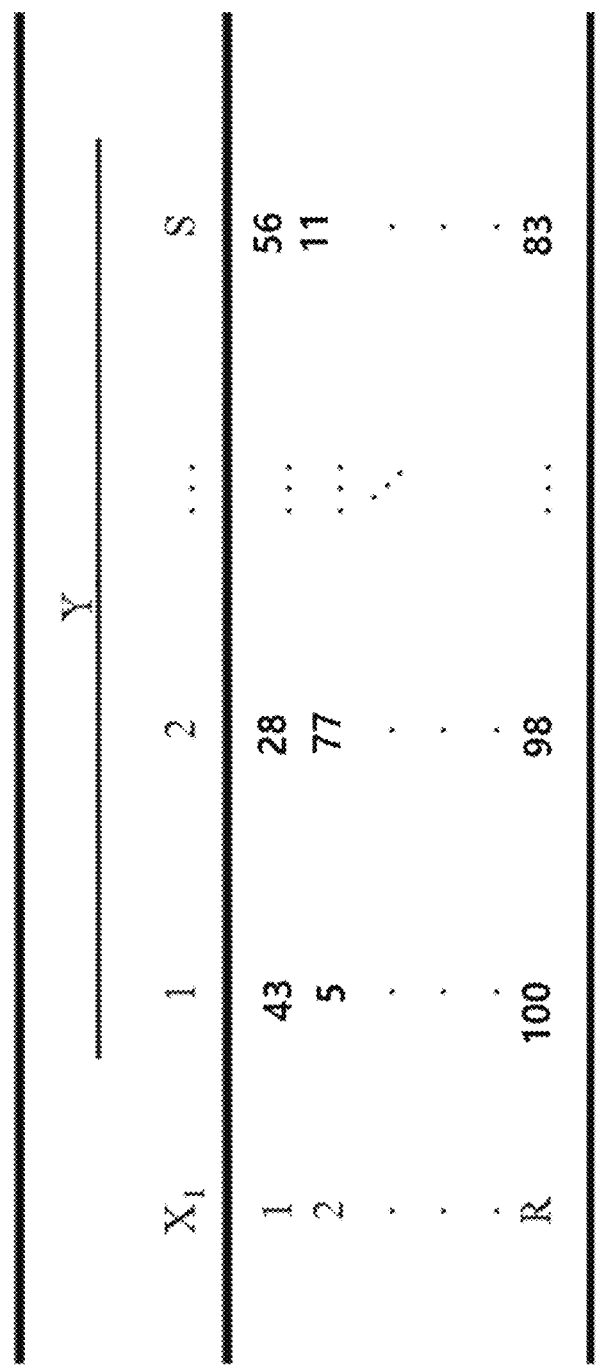
FIG. 3 shows the table of FIG. 2 with a count of records populated for each table cell from operating a model on a dataset.

Referring now to FIGS. 2 and 3, the model can be denoted as M, and the model accuracy on the whole dataset can be denoted A. Suppose predictor $X_1$ has R categories and target Y has S categories. For table cell (x,y), its value, as shown in FIG. 3, is a count of records that fall into this (x,y) value pair.

Figure 5:
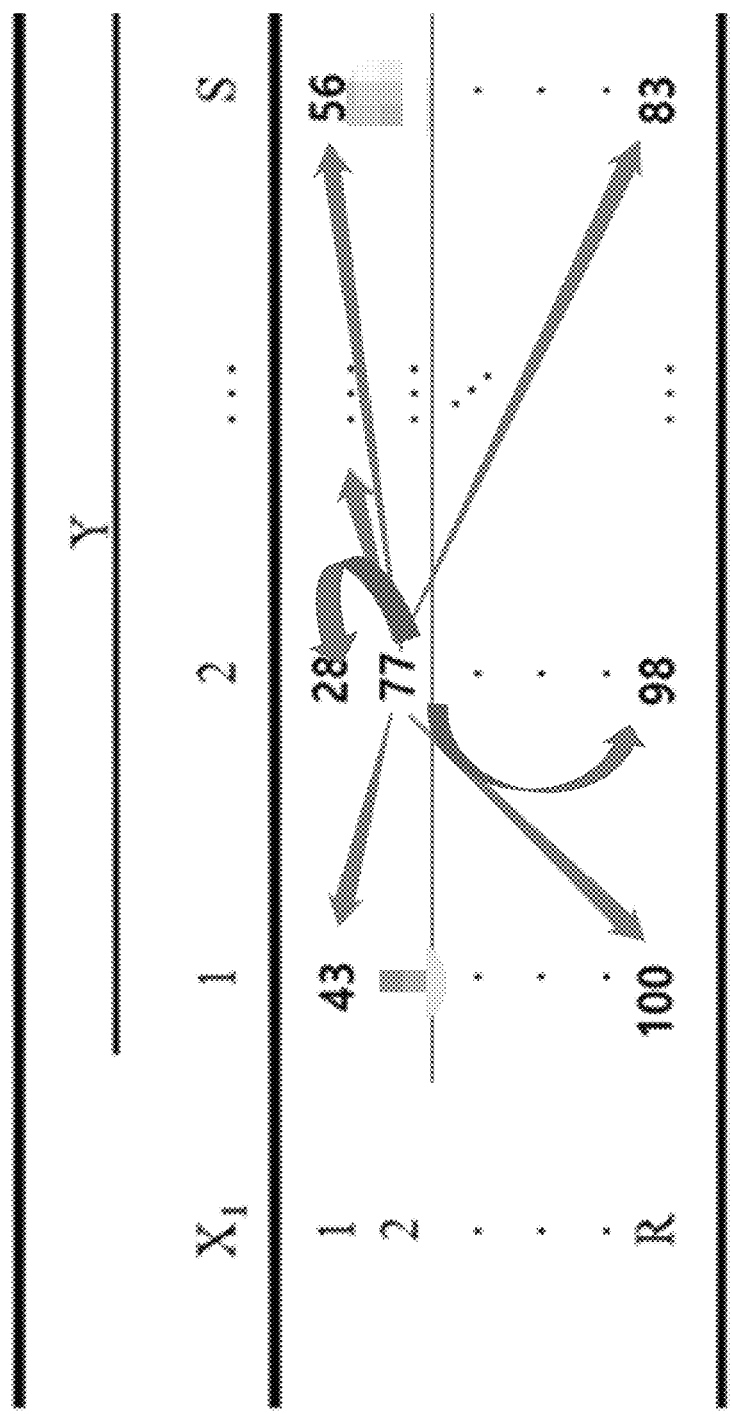
FIG. 5 shows the use of the table of FIG. 3 for a computation of model accuracy changes for making a determination of category importance, consistent with an illustrative embodiment.

Referring to FIGS. 4 and 5, for a given feature (e.g., $X_1$), the importance of a given category (e.g., $X_1=x_{1,r}$, the r-th category value of $X_1$, shown underscored in FIG. 4) can be computed. The computation of the CI includes an assignment of $X_1=x_{1,r}$ to other category values according to category distribution. This involves obtaining the cumulative distribution for categories of feature $X_1$ when the $r^{th}$ category of $X_1$ is excluded. Assume the total number of records is N, among which the total number of records with $X_1=x_{1,r}$ is $n_{1,r}$. For the $k^{th}$ category (k≠r), the frequency of $X_1=x_{1,k}$ is then $[n_{1,k}/(N-n_{1,r})]$. The cumulative distribution for $X_1=x_{1,k}$ is the summation of $[n_{1,1}/(N-n_{1,r})]$ to $[n_{1,k}/(N-n_{1,r})]$ if k<r. If k>r, then the cumulative distribution is the summation of $[n_{1,1}/(N-n_{1,r})]$ to $[n_{1,k}/(N-n_{1,r})]$ minus $[n_{1,r}/(N-n_{1,r})]$. The results of these calculations on the table of FIG. 3 is shown in FIG. 4.

Next, for each record with $X_1=x_{1,r}$, a random number b is drawn from [0,1]. $X_1=x_{1,r}$ is then reassigned to $X_1=x_{1,k}$ if b is greater than the cumulative distribution value of $x_{1,k-1}$ and no larger than that of $x_{1,k}$. This step is applied to all records with $X_1=x_{1,r}$. For example, in FIG. 5, the 77 records are shown being reassigned to other categories. If the random number drawn for the first record of the 77 records is <=0.2, then that record is reassigned to category 1. If the random number drawn for the second record of the 77 records is more than 0.2, but no larger than 0.38, then the record is reassigned to category 3. This process is performed for each record.

Once the records for the r-th category (in this case, where r=2) are reassigned, these records are scored with the model and the accuracy of the model is then re-computed. The lower the accuracy $A_{1,r}$, the stronger the $CI_{1,r}$. It should be noted that $CI_{1,r}$ represents the Category Importance (CI) for the $r^{th}$ category value of $X_1$). The $CI_{1,r}$ can be quantified by a computation of $CI_{1,r}=A/A_{1,r}$, where A is the accuracy of the model without the reassignment of the records of the r-th feature, and $A_{1,r}$ is the accuracy of the model with the reassignment of the records of the r-th feature according to a cumulative distribution of the records (excluding the r-th feature records). Additional CI's can be determined for each of the categories.

Figure 6:
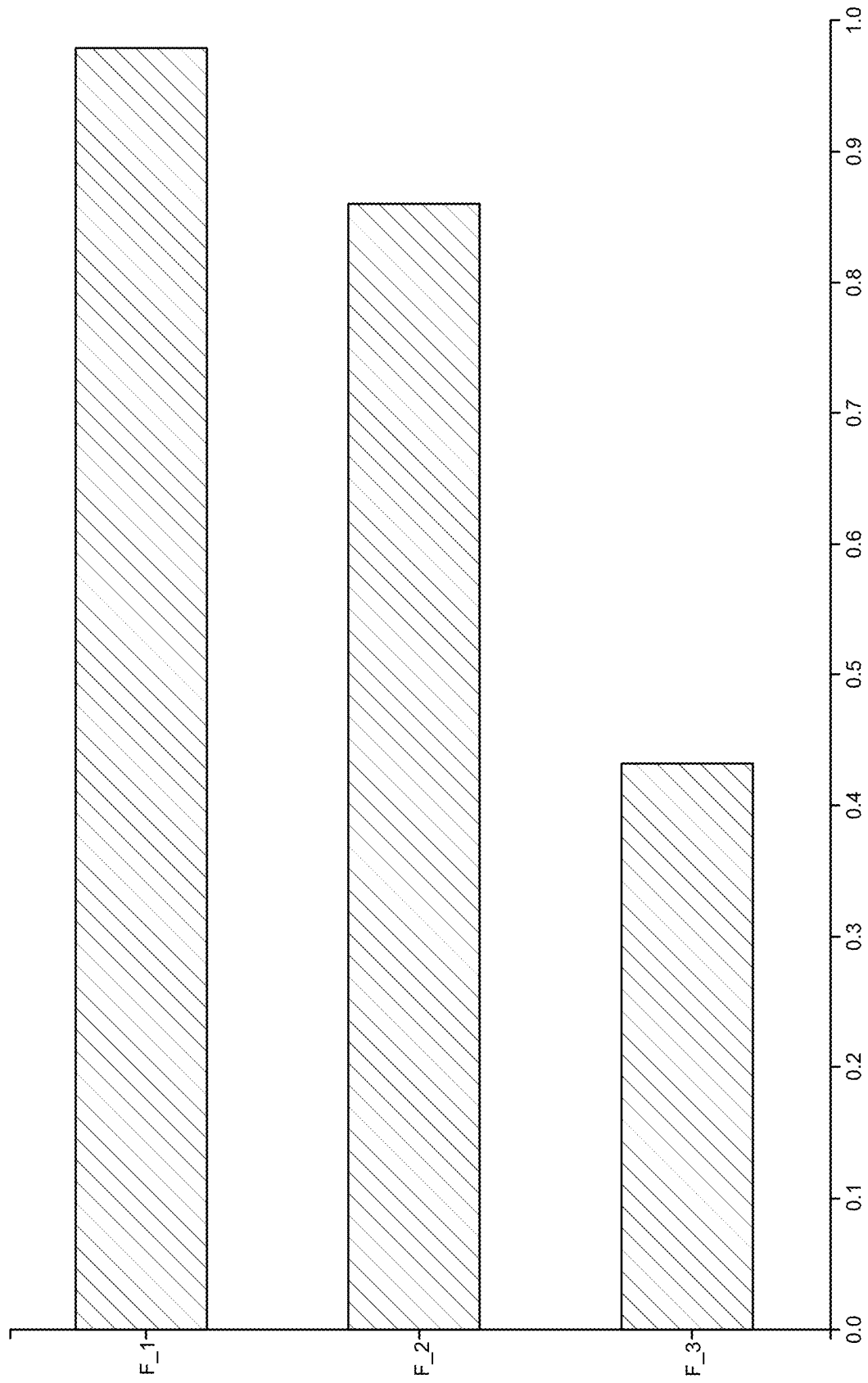
FIG. 6 shows a feature importance graph showing an importance of a top three key features.
Figure 7:
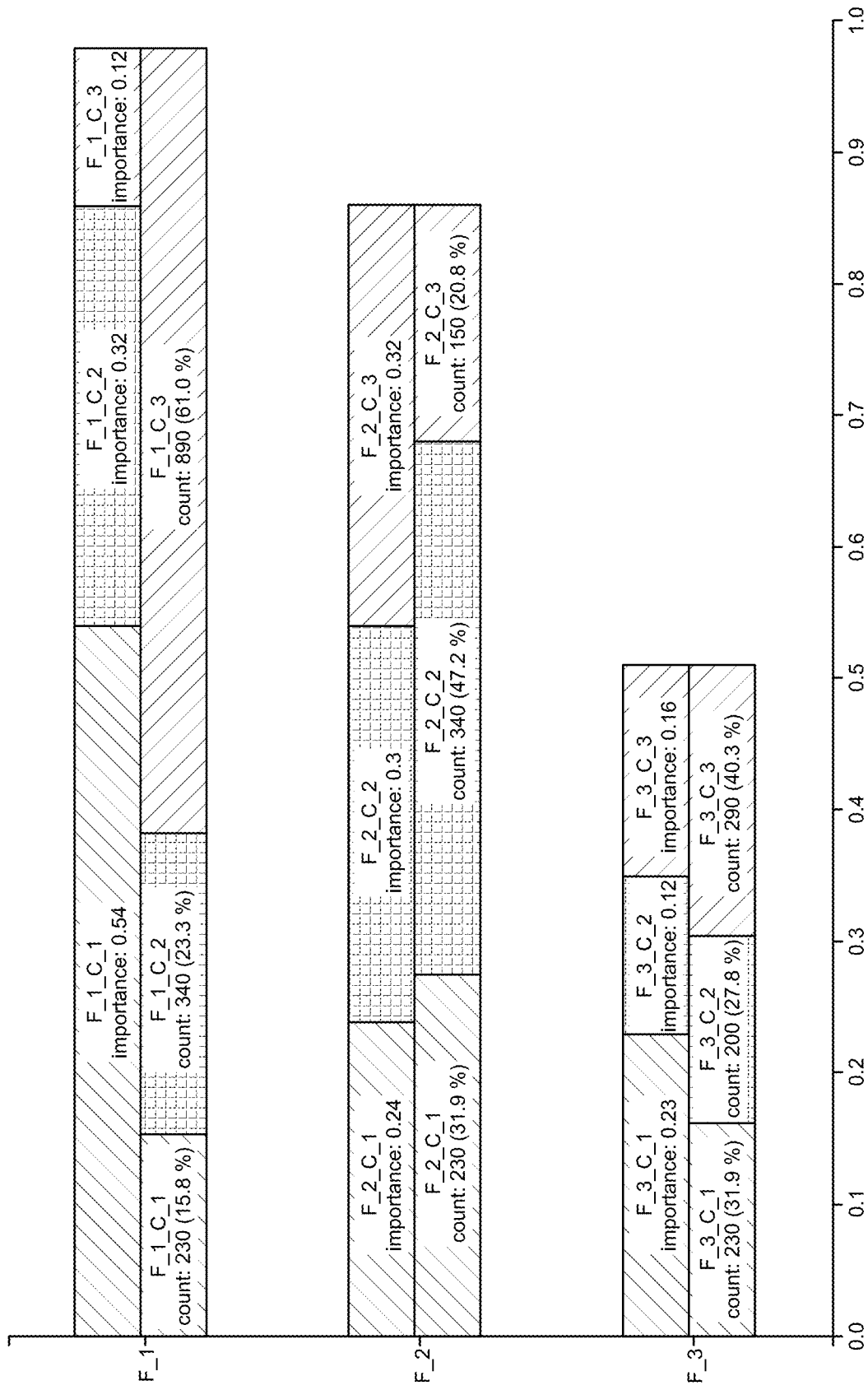
FIG. 7 shows a category importance chart overlayed with the feature importance graph of FIG. 6, consistent with an illustrative embodiment.

Referring to FIG. 6, a feature importance graph shows an importance of a top three key features as provided by the model. In FIG. 7, a category importance chart is overlayed with the feature importance. Such data provides the user with a visualization of not only the feature importance between Features 1, 2 and 3, the chart also shows, for each feature, the calculated category importance for each feature and the total number of records for each feature.

Figure 8:
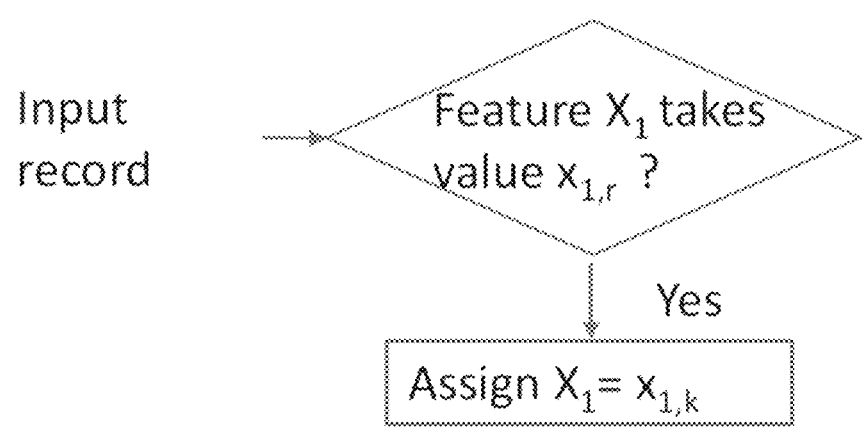
FIG. 8 shows a flow chart for testing for a category merge, consistent with an illustrative embodiment.
Figure 9:
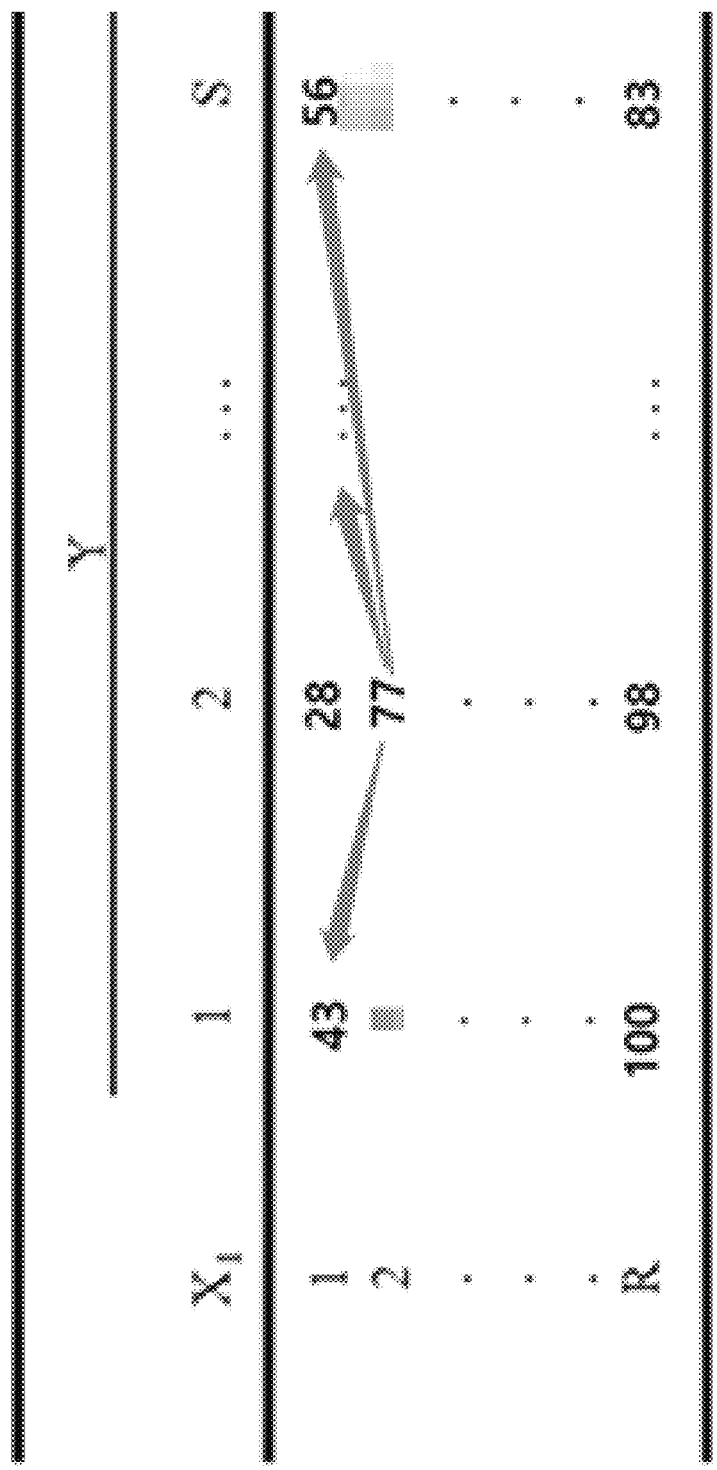
FIG. 9 shows an example of merging the results from one category into another, consistent with an illustrative embodiment.

Referring now to FIGS. 8 and 9, for the categories with a weak CI (below a certain threshold, as discussed above), a category merge can be performed of weak categories that belong to the same feature. For example, the red and green color outfits may be merged together and simply defined as "non-yellow" outfits. Again, feature $X_1$ can be used as an example. Suppose category $X_1=x_{1,r}$ and category $X_1=x_{1,k}$. FIG. 8 shows an example of merging the $r^{th}$ category value into the $k^{th}$ one. More specifically, FIG. 9 illustrates an example where the records of category 2 is merged into category 1. While a change in the accuracy of the model is expected with such a merge, as described above, the categories designated as having a weak CI are those that result in minimal change of accuracy in the model when such a category is reassigned. Accordingly, such a change in accuracy of the model may be minimal when those categories with weak CI are merged.

When there are multiple ways to merge the category with weak CI, for example, suppose category $X_1=x_{1,r}$ and category $X_1=x_{1,k}$, and they both have a weak CI. Then, there are two ways to perform the merge, either merge $X_1=x_{1,r}$ into category $X_1=x_{1,k}$ or the other way around. Typically, the merge that results in the minimum accuracy change is taken, under the condition that the accuracy change is below a given merge accuracy threshold.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
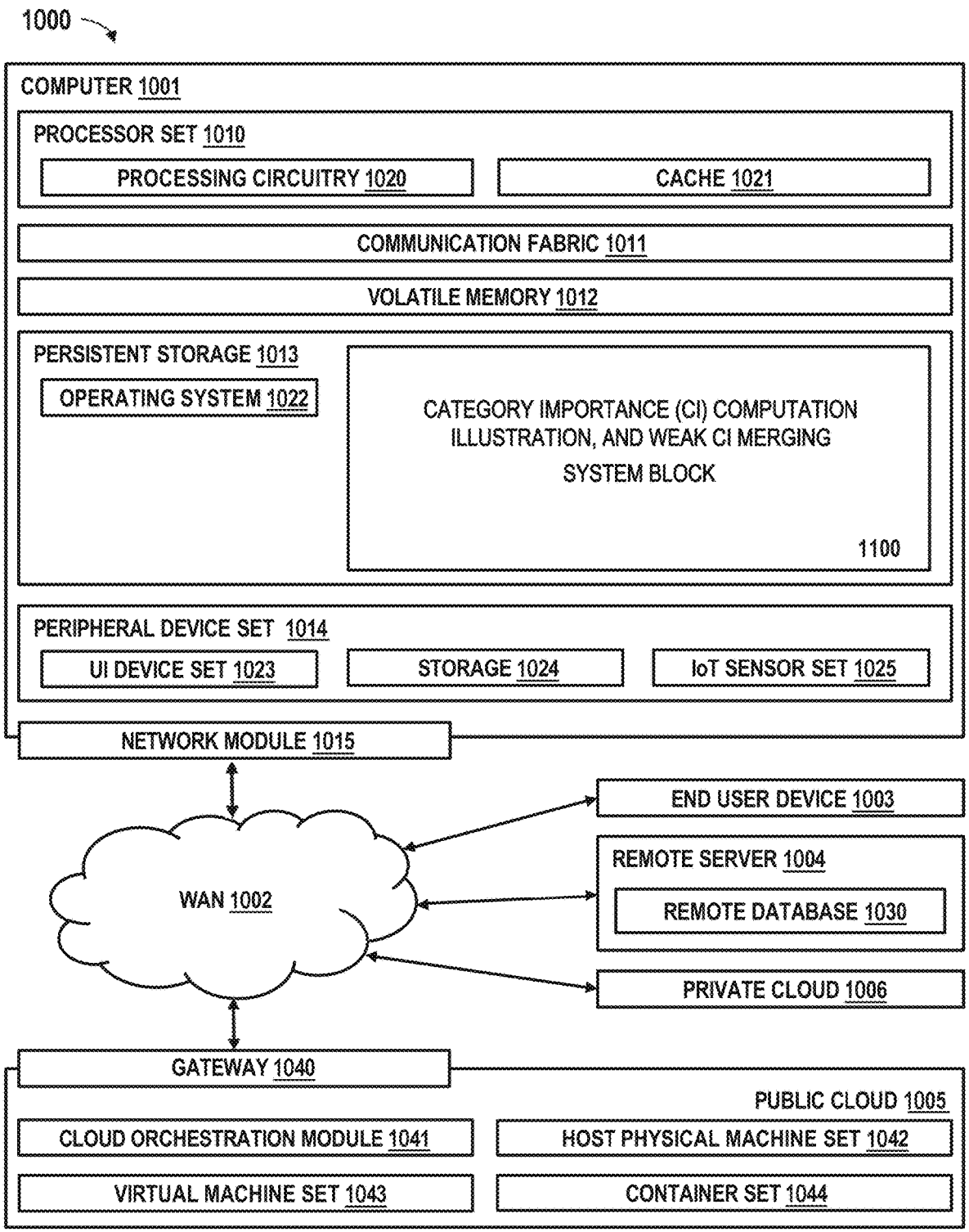
FIG. 10 is a functional block diagram illustration of a computer hardware platform that can be used to implement the method for computing post-modeling category importance, detecting and illustrating key categories, and merging categories with weak importance, consistent with an illustrative embodiment.

Referring to FIG. 10, computing environment 1000 includes an example of an environment for the execution of at least some of the computer code involved in performing the inventive methods, including category importance (CI) computation, illustration, and weak CI merging system block 1100. In addition to block 1100, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1100, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1100 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1100 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for treating post-modeling data, the method comprising:
    selecting a category of a feature;
    computing a first category importance (CI) value for the selected category of the feature, wherein the first CI value is based on a model accuracy change after reassigning records of the selected category to a remaining set of categories of the feature according to a cumulative distribution of records among the remaining set of categories of the feature, wherein the remaining set of categories include each category of the feature, except for the selected category; and computing additional CI values for each category in the remaining set of categories by assigning each category as the selected category and determining the model accuracy change when records of the selected category are reassigned to the remaining set of categories of the feature according to the cumulative distribution of records among the remaining set of categories of the feature, wherein the remaining set of categories include all categories of the feature, except for the selected category.

2. The computer-implemented method of claim 1, further comprising providing an illustration of strong CI categories with a CI value above a predetermined CI value threshold, wherein the illustration includes both the CI values of the strong CI categories of the feature and a number of records provided for the strong CI categories of the feature.

3. The computer-implemented method of claim 2, wherein the illustration further includes weak CI categories with the CI value less than the predetermined CI value threshold.

4. The computer-implemented method of claim 1, wherein the reassigning of the remaining set of categories of the feature includes obtaining the cumulative distribution of records among the remaining set of categories of the feature by denoting the selected category as an r-th category, assuming a total number of records is N, among which the total number of records of the selected category, r, is $n_r$, and for a k-th category, where the k-th category is selected from the remaining set of categories, the cumulative distribution for the k-th category is a summation of $[n_1/(N-n_r)]$ to $[n_k/(N-n_r)]$ if k<r or a summation of $[n_1/(N-n_r)]$ to $[n_k/(N-n_r)]$ minus $[n_r/(N-n_r)]$ if k>r, wherein $n_k$ is a number or records of the k-th category and $n_1$ is the number of records of a first one of the categories.

5. The computer-implemented method of claim 1, wherein the reassigning of the remaining set of categories of the feature includes drawing a random number b from [0,1] for each record in the selected category and reassigning each record to one category of the set of remaining categories based on a comparison of the random number to the cumulative distribution for each category.

6. A computer-implemented method for treating post-modeling data, the method comprising:
selecting a category of a feature;
computing a first category importance (CI) value for the selected category of the feature, wherein the first CI value is based on a model accuracy change after reassigning records of the selected category to a remaining set of categories of the feature according to a cumulative distribution of records among the remaining set of categories of the feature, wherein the remaining set of categories include each category of the feature, except for the selected category; and
performing a post-modeling category merge of each category having the CI value less than the CI value threshold.

7. The computer-implemented method of claim 6, further comprising reducing data collection computational overhead by relying on a reduced number of categories based on the post-modeling category merge for new data.

8. The computer-implemented method of claim 6, wherein, when a first category and a second category each have respective CI value less than the CI value threshold, the method further comprises:
determining a first model accuracy change based on a first merge process of merging the first category into the second category;
determining a second model accuracy change based on a second merge process of merging the second category into the first category; and
performing the first merge process when the first model accuracy change is less than the second model accuracy change; and
performing the second merge process with the second model accuracy change is less than the first model accuracy change.

9. A computer-implemented method for treating post-modeling data, the method comprising:
computing, sequentially for each category of a feature, a category importance (CI) value, wherein the CI value is based on a model accuracy change after reassigning records of a category being examined to a remaining set of categories of the feature according to a cumulative distribution of records among the remaining set of categories of the feature; and
the remaining set of categories include all categories of the feature, except for the category being examined; and
performing a post-modeling category merge of each category having the CI value less than a CI value threshold.

10. The computer-implemented method of claim 9, further comprising reducing data collection computational overhead by relying on a reduced number of categories based on the post-modeling category merge for new data.

11. The computer-implemented method of claim 9, wherein, when a first category and a second category each have respective CI value less than the CI value threshold, the method further comprises:
determining a first model accuracy change based on a first merge process of merging the first category into the second category;
determining a second model accuracy change based on a second merge process of merging the second category into the first category;
performing the first merge process when the first model accuracy change is less than the second model accuracy change; and
performing the second merge process with the second model accuracy change is less than the first model accuracy change.

12. The computer-implemented method of claim 9, further comprising providing an illustration of strong CI categories with a CI value above a predetermined CI value threshold, wherein the illustration includes both the CI values of the strong CI categories of the feature and a number of records provided for the strong CI categories of the feature.

13. The computer-implemented method of claim 12, wherein the illustration further includes weak CI categories with the CI value being less than the predetermined CI value threshold.

14. The computer-implemented method of claim 9, wherein the reassigning of the remaining set of categories of the feature includes obtaining the cumulative distribution of records among the remaining set of categories of the feature by denoting a selected category as an r-th category, assuming a total number of records is N, among which the total number of records of the selected category, r, is $n_r$, and for a k-th category, where the k-th category is selected from the remaining set of categories, the cumulative distribution for the k-th category is a summation of $[n_1/(N-n_r)]$ to $[n_k/(N-n_r)]$ if k<r or a summation of $[n_1/(N-n_r)]$ to $[n_k/(N-n_r)]$ minus $[n_r/(N-n_r)]$ if k>r, wherein $n_k$ is a number or records of the k-th category and $n_1$ is the number of records of a first one of the categories.

15. The computer-implemented method of claim 14, wherein the reassigning of the remaining set of categories of the feature includes drawing a random number b from [0,1] for each record in the selected category and reassigning each record to one category of the set of remaining categories based on a comparison of the random number to the cumulative distribution for each category.

16. A non-transitory computer readable storage medium tangibly embodying a computer readable program code having computer read able instructions that, when executed, causes a computer device to carry out a method of treating post-modeling data, the method comprising:
   computing, sequentially for each category of a feature, a category importance (CI) value, wherein:
      the CI value is based on a model accuracy change when records of its corresponding category are reassigned to a remaining set of categories of the feature according to a cumulative distribution of records among the remaining set of categories of the feature; and
      the remaining set of categories include all categories of the feature, except for the category for which the CI value is being computed; and
   performing a post-modeling category merge of each category having the CI value less than a CI value threshold.

17. The non-transitory computer readable storage medium of claim 16, further comprising reducing data collection computational overhead by relying on a reduced number of categories based on the post-modeling category merge for new data.

18. The non-transitory computer readable storage medium of claim 16,
   wherein, when a first category and a second category each have respective CI value less than the CI value threshold, the method further comprises:
   determining a first model accuracy change based on a first merge process of merging the first category into the second category;
   determining a second model accuracy change based on a second merge process of merging the second category into the first category; and
   performing the first merge process when the first model accuracy change is less than the second model accuracy change; and
   performing the second merge process with the second model accuracy change is less than the first model accuracy change.

19. The non-transitory computer readable storage medium of claim 16, further comprising providing an illustration of strong CI categories with a CI value above a predetermined CI value threshold, wherein the illustration includes both the CI values of the strong CI categories of the feature and a number of records provided for the strong CI categories of the feature.

* * * * *